United States Patent
Shurboff et al.

(10) Patent No.: US 7,884,869 B2
(45) Date of Patent: Feb. 8, 2011

(54) ASSIGNMENT OF PIXEL ELEMENT EXPOSURE TIMES IN DIGITAL CAMERA MODULES AND MOBILE COMMUNICATION DEVICES

(75) Inventors: Carl L. Shurboff, Grayslake, IL (US); Fan He, Gurnee, IL (US)

(73) Assignee: Motorola Mobility, Inc., Libertyville, IL (US)

(*) Notice: Subject to any disclaimer, the term of this patent is extended or adjusted under 35 U.S.C. 154(b) by 749 days.

(21) Appl. No.: 11/742,269

(22) Filed: Apr. 30, 2007

(65) Prior Publication Data

US 2008/0266425 A1   Oct. 30, 2008

(51) Int. Cl.
*H04N 3/14* (2006.01)
*H04N 5/335* (2006.01)

(52) U.S. Cl. .................. 348/297; 348/302; 348/308
(58) Field of Classification Search ............. 348/308
See application file for complete search history.

(56) References Cited

U.S. PATENT DOCUMENTS

| | | | |
|---|---|---|---|
| 4,876,590 A * | 10/1989 | Parulski | 348/281 |
| 4,891,692 A | 1/1990 | Outa | |
| 5,521,640 A * | 5/1996 | Prater | 348/273 |
| 6,693,670 B1 * | 2/2004 | Stark | 348/308 |
| 6,972,995 B1 * | 12/2005 | Hopper et al. | 365/185.19 |
| 7,092,448 B2 * | 8/2006 | Turaga et al. | 375/240.26 |
| 7,224,390 B2 * | 5/2007 | Kokubun et al. | 348/308 |
| 7,508,434 B2 * | 3/2009 | He et al. | 348/308 |
| 7,566,855 B2 * | 7/2009 | Olsen et al. | 250/208.1 |
| 7,710,481 B2 * | 5/2010 | He et al. | 348/308 |
| 2003/0020827 A1 | 1/2003 | Bean et al. | |
| 2003/0169357 A1 | 9/2003 | Kubo | |
| 2005/0134712 A1 | 6/2005 | Gruhlke et al. | |

(Continued)

FOREIGN PATENT DOCUMENTS

EP    0823814 B1    4/1997

(Continued)

OTHER PUBLICATIONS

Orly Yadid-Pecht et al.: "CMOS Active Pixel Sensor Star Tracker with Regional Electronic Shutter", IEEE Journal of Sold-State Circuits, IEEE Service Center, Pscataway, NJ, US vol. 32, No. 2, Feb. 1, 1997, all pages.

(Continued)

*Primary Examiner*—Ngoc-Yen T Vu

(57) ABSTRACT

A method and digital imaging device, such as a digital camera module, is provided for digital imaging. The method includes the step of determining a signal-to-noise ratio associated with a first pixel location of a plurality of pixel locations and a signal-to-noise ratio associated with a second pixel location of the plurality of pixel locations, and the steps of assigning a first exposure time to the first pixel location in response to the signal-to-noise ratio associated with the first pixel location and assigning a second exposure time different from the first exposure time to the second pixel in response to the signal-to-noise ratio associated with the second pixel location. The method further includes the step of exposing the first pixel location for the first exposure time while exposing the second pixel location for the second exposure time to create a digital image.

36 Claims, 6 Drawing Sheets

U.S. PATENT DOCUMENTS

2005/0275737 A1* 12/2005 Cheng ............... 348/333.02
2006/0192873 A1* 8/2006 Yaffe ..................... 348/297
2007/0132867 A1* 6/2007 Rhee et al. ............. 348/302

FOREIGN PATENT DOCUMENTS

WO 9909737 A1 11/1997

OTHER PUBLICATIONS

Tarek Lule et al.: "Design and Fabrication of a High-Dynamic-Range Image Sensor in TFA Technology", IEEE Journal of Sold-State Circuits, IEEE Service Center, Piscataway, NJ, US, vol. 34, No. 5, May 1, 1999, all pages.

* cited by examiner

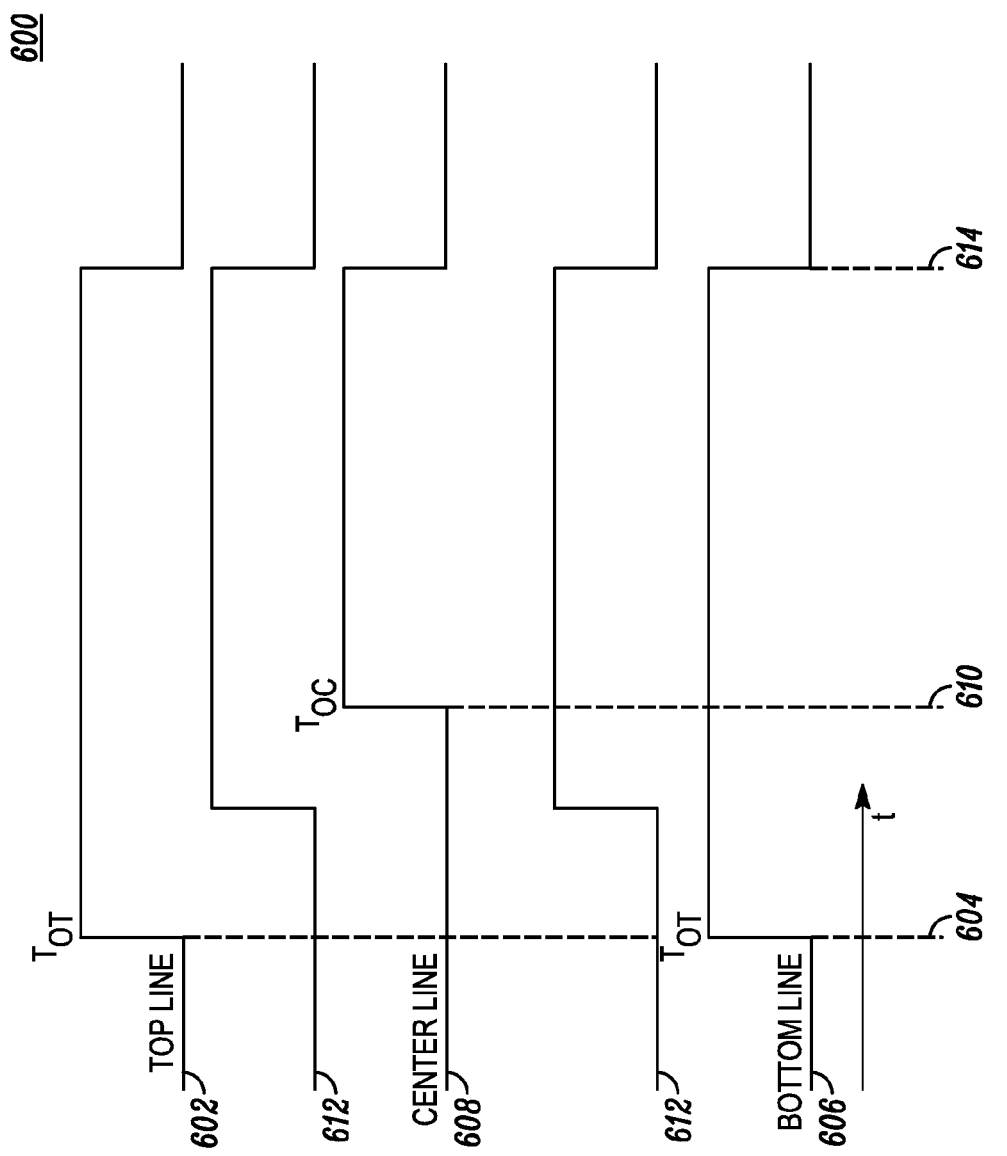

US 7,884,869 B2

ASSIGNMENT OF PIXEL ELEMENT EXPOSURE TIMES IN DIGITAL CAMERA MODULES AND MOBILE COMMUNICATION DEVICES

FIELD OF THE INVENTION

The present invention generally relates to digital cameras, and more particularly relates to methods and apparati for enhanced digital imaging for digital cameras.

BACKGROUND OF THE DISCLOSURE

A digital camera captures and stores information digitally representing an image seen through a lens of the digital camera. The current trend in digital cameras is to reduce the size of the cameras as well as incorporating digital cameras in other devices such as cellular telephones. As the size of the camera is reduced, the camera's lens system is also reduced. All lens systems have shading issues because the amount of light in the corners of an image is always less than the light in the center of an image. A small lens system creates even greater shading issues for the camera in that the small lens system causes a bright center of the image information with vignetting towards the corners of the image. While conventional digital shading correction schemes may brighten the corners of a digital image, the schemes also amplify any noise. Thus, such schemes are not practical when the signal to noise ratio is not high enough.

Accordingly, what is needed is a method and apparatus for digital imaging without the drawbacks of prior art schemes. Furthermore, other desirable features and characteristics of the present invention will become apparent from the subsequent detailed description of the invention and the appended claims, taken in conjunction with the accompanying drawings and this background of the disclosure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 6 is a timing diagram for timing signals for exposure times assigned to the pixel locations of the pixel array of FIG. 2 in accordance with the embodiment of the present invention.

Figure 1:
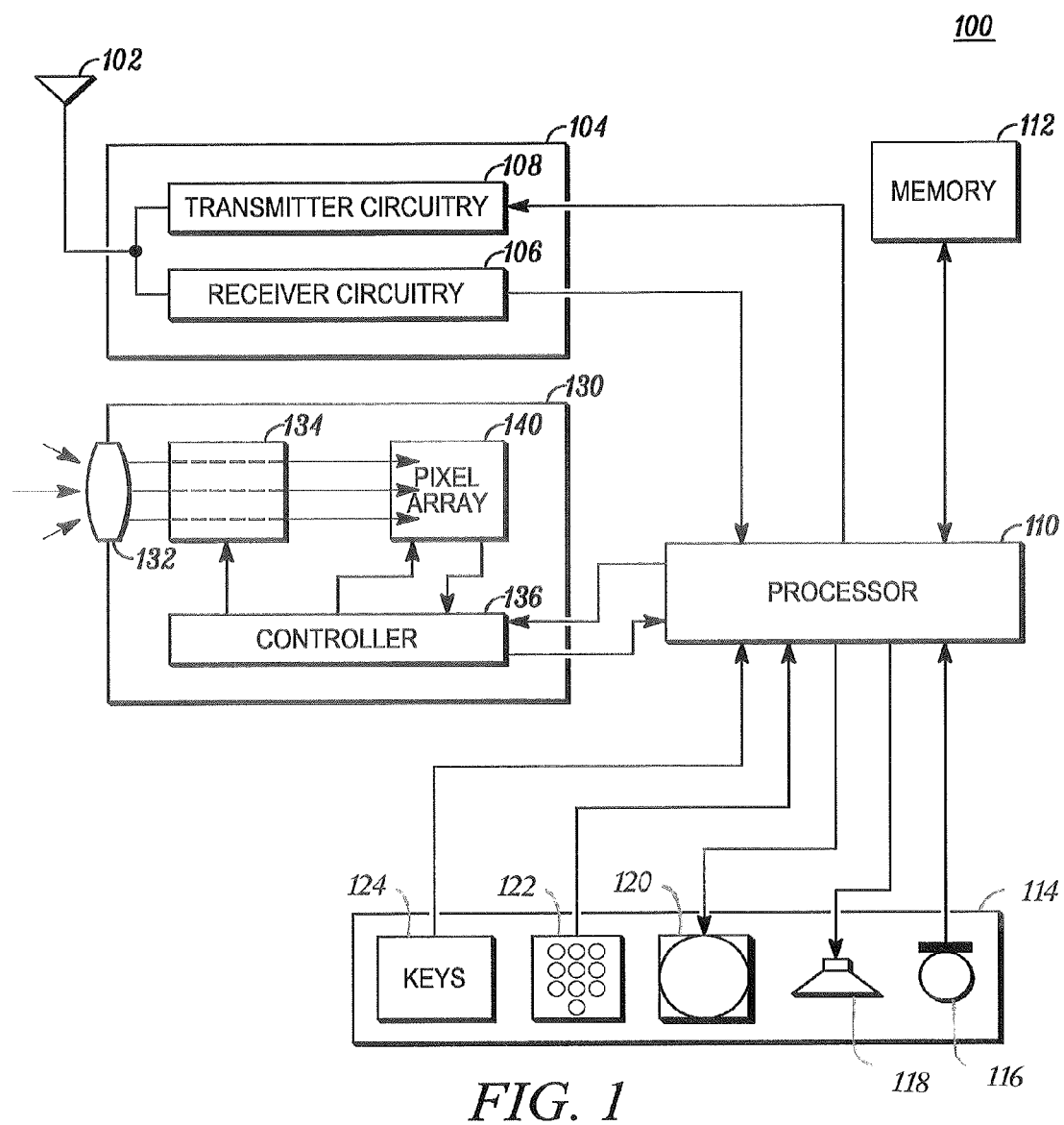
FIG. 1 depicts a mobile communication device having a digital camera module in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to enhanced digital imaging by an improved digital camera module. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the targeted paging of a mobile communication device described herein. The non-processor circuits may include, but are not limited to, a radio frequency transceiver, clock circuits, power source circuits, and user input devices. As such, these functions may be interpreted as steps of a method to perform targeted paging in a multi-cell wireless communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Accordingly, a method is provided for digital imaging. The method includes the steps of determining a signal-to-noise ratio associated with a first pixel location of a plurality of pixel locations and a signal-to-noise ratio associated with a second pixel location of the plurality of pixel locations, assigning a first exposure time to the first pixel location in response to the signal-to-noise ratio associated with the first pixel location, and assigning a second exposure time different from the first exposure time to the second pixel in response to the signal-to-noise ratio associated with the second pixel location. The method further includes the step of exposing the first pixel location for the first exposure time while exposing the second pixel location for the second exposure time to create a digital image.

A digital imaging device is also provided which includes a plurality of light sensitive pixel elements, a plurality of analog nonvolatile memory cells and a controller. Each of the plurality of analog nonvolatile memory cells is coupled to an associated one of the plurality of light sensitive pixel elements and stores an exposed light pixel value associated with a portion of a digital image, the exposed light pixel value corresponding to an amount of light sensed by the associated one of the plurality of light sensitive pixel elements during one of a plurality of exposure times. The controller is coupled to the plurality of analog nonvolatile memory cells for activating each of them for an associated one of the plurality of exposure times.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 depicts a mobile communication device 100 implementing a digital imager, such as a digital camera module, in accordance with an embodiment of the present invention. While the electronic device shown is a mobile communication device 100, such as a cellular telephone, the digital imager can be implemented as a standalone digital camera or can be implemented in other electronic devices.

The mobile communication device 100 includes an antenna 102 for receiving and transmitting radio frequency (RF) signals. The antenna 102 is coupled to transceiver circuitry 104 in a manner familiar to those skilled in the art. The transceiver circuitry 104 includes receiver circuitry 106 and transmitter circuitry 108. The receiver circuitry 106 demodulates and decodes received RF signals to derive information therefrom and is coupled to a processor 110 and provides the decoded information to the processor 110 for utilization by the processor 110 in accordance with the function(s) of the mobile communication device 100. The processor 110 also provides information to the transmitter circuitry 108 of the transceiver circuitry 104 for encoding and modulating the information into RF signals for transmission from the antenna 102.

As is well-known in the art, the processor 110 is coupled to a memory 112 which stores data and operational information for use by the processor 110 to perform the functions of the mobile communication device 100. The processor 110 is also coupled to conventional user interface devices 114, such as any or all of a microphone 116, a speaker 118, a display 120, a keypad 122 and/or functional key input devices 124, for receiving user inputs and/or providing information to the user of the mobile communication device 100.

In accordance with the embodiment of the present invention, the mobile communication device 100 also includes a digital camera module 130. The digital camera module includes a lens system 132 arranged to allow light into the digital camera module 130. A mechanical shutter 134 operating under the control of a controller 136 may be included to selectively allow light focused through the lens system to pass into the digital camera module 130 to a pixel array 140. Alternatively, instead of a mechanical shutter 134, the controller 136 can manipulate the pixel array 140 to electronically shutter it, thereby providing a shuttering method providing both reduced size of and reduced power consumption by the digital camera module 130.

Under the control of the controller 136, the pixel array 140, receiving an image through the lens system 132, can record a digital representation of the image. When the controller 136 signals the pixel array 140, the pixel array 140 records the image formed by the light focused by the lens system 132 thereon. In addition to being coupled to the controller 136 for receiving operational control signals therefrom, the pixel array 140 is coupled to the controller 136 for providing digital image information thereto. The controller 136 is additionally coupled to the processor 110 for receiving operational signals therefrom (such as user input signals from the user interface devices 114) and for providing image information thereto for storage in the memory 112 or for provision to the transmitter circuitry 108 for wireless transmission of the image information from the mobile communication device 100.

Figure 2:
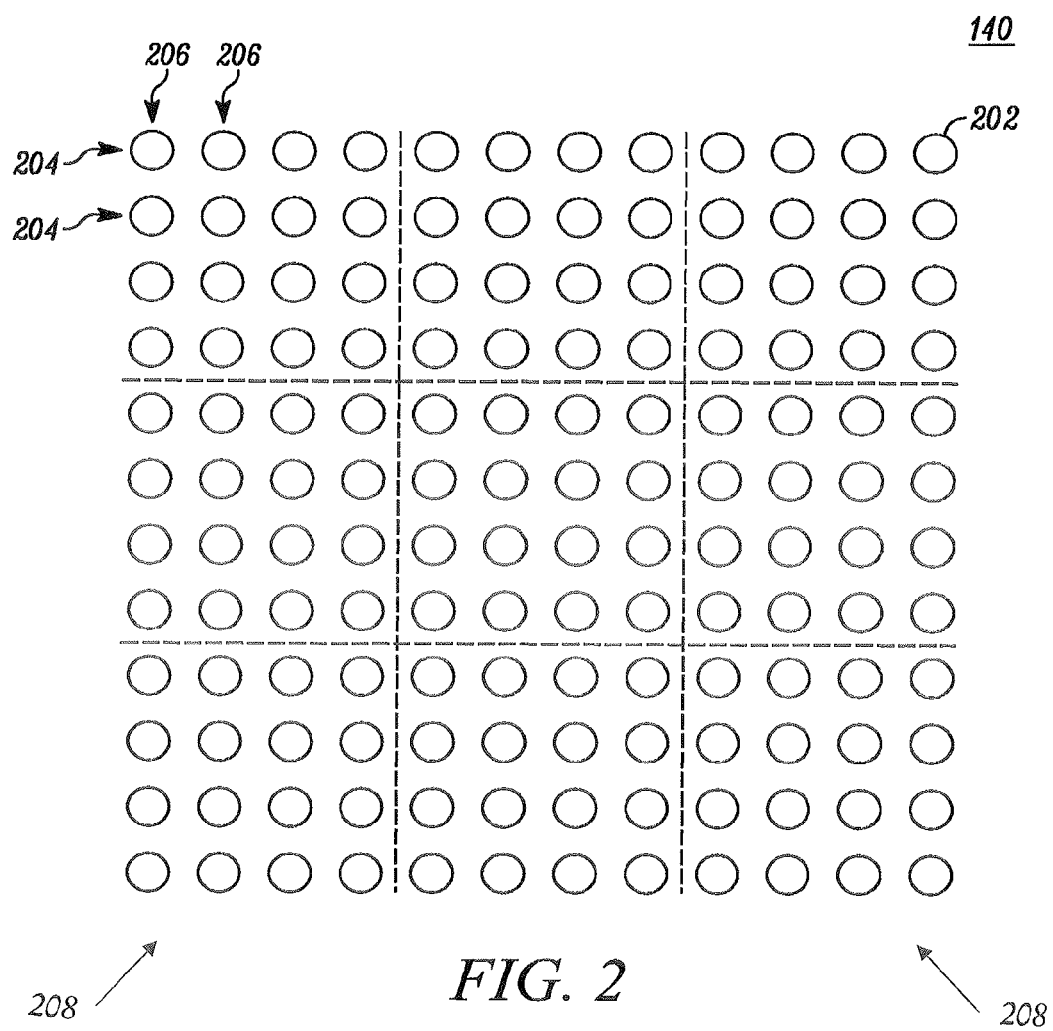
FIG. 2 depicts a pixel array of the digital camera module of FIG. 1 in accordance with an embodiment of the present invention.

Referring to FIG. 2, the pixel array 140 in accordance with the embodiment of the present invention includes a plurality of pixel locations 202 arranged in an array having pixel rows 204 and pixel columns 206. In accordance with the embodiment of the present invention, a digital image having improved image quality can be recorded by the pixel array 140 by varying the exposure time of the plurality of pixel locations 202 in response to signal-to-noise ratio measurements. For the highest improvability in accordance with the present invention, the pixel exposure time can be varied pixel by pixel by measuring the signal-to-noise ratio at each of the plurality of pixel locations 202 and calculating and assigning a pixel exposure time in response thereto. Such variation, however, may require substantial calculation time to determine the various pixel exposure times. The calculation time may be reduced by determining appropriate exposure times for a pixel row 204 or a pixel column 206 as described hereinbelow.

Further, in accordance with the embodiment of the present invention, various exposure times may be calculated and assigned to a plurality of predetermined quadrants 208. While nine predetermined quadrants 208 are shown in FIG. 2, the embodiment of the present invention is not limited thereto; the plurality of predetermined quadrants 208 could number four, sixteen, etc., such number being calculated in response to the calculation time parameter of the digital camera module 130.

In addition, while FIG. 2 depicts regularly defined square quadrants, the plurality of predetermined quadrants 208 could be irregularly defined across the pixel array 140 for a digital camera module 130 (i.e., differing ones of the plurality of predetermined quadrants 208 could include differing numbers of pixel locations 202), the plurality of predetermined quadrants 208 irregularly defined in response to particular parameters of the digital camera module 130. For example, the plurality of predetermined quadrants 208 could be irregularly defined in response focal parameters of the lens system 132, wherein a focal hotspot on a ten-by-sixteen array of pixel locations 202 in the center of the pixel array 140 could be defined as one of the plurality of predetermined quadrants 208, with other predetermined quadrants 208 defined in accordance therewith.

Figure 3:
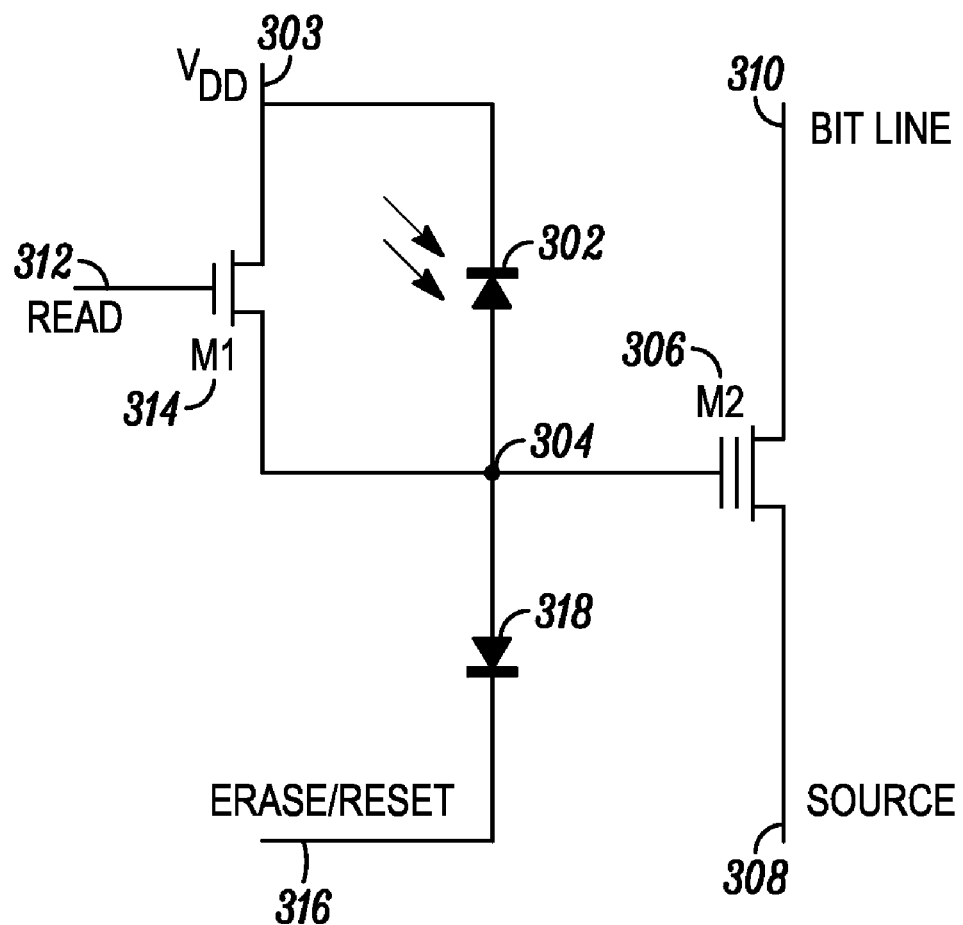
FIG. 3 depicts a pixel location of the pixel array of FIG. 2 in accordance with an embodiment of the present invention.

Referring to FIG. 3, one of the plurality of pixel locations 202 enabled in accordance with the embodiment of the present invention is shown. A light sensitive pixel element 302, such as a light sensing diode, is provided at each of the plurality of pixel locations 202 to sense the light received thereat. The light sensitive pixel element 302 is biased by a voltage $V_{dd}$ received on a line 303 to generate a voltage at the node 304 in response to the light sensed by the light sensitive pixel element 302. In accordance with the embodiment of the present invention, the node 304 is coupled to an analog nonvolatile memory cell 306 for providing a voltage thereto storing, the stored voltage being an analog value representative of the light sensed by the light sensitive pixel element 302.

The analog nonvolatile memory cell 306 is connected to a source line 308 and a bit line 310 corresponding to the pixel row 204 and the pixel column 206 of the pixel location 202. The source line 308 and the bit line 310 are coupled to the controller 136 and receive appropriate signals when a digital image is being recorded to store the analog value of a voltage being received by the analog nonvolatile memory cell 306 from the node 304.

When image information representing a recorded digital image is to be retrieved by the controller 136 from the plurality of pixel locations 202, a signal is provided on a read line 312 to the gate of a transistor 314 to allow the controller 136 to determine the value stored in the analog nonvolatile memory cell 306 in a manner well known to those skilled in the art. The controller 136 erases or resets the analog nonvolatile memory cell 306 by switching the voltage on a reset line 316 from high to low in synchronization with voltages applied to the bit line 310 and the source line 308. The lower voltage on the reset line 316 allows current to flow through the diode 318 thereby pulling the node low and allowing current to flow through the analog nonvolatile memory cell 306 to erase it.

Figure 4:
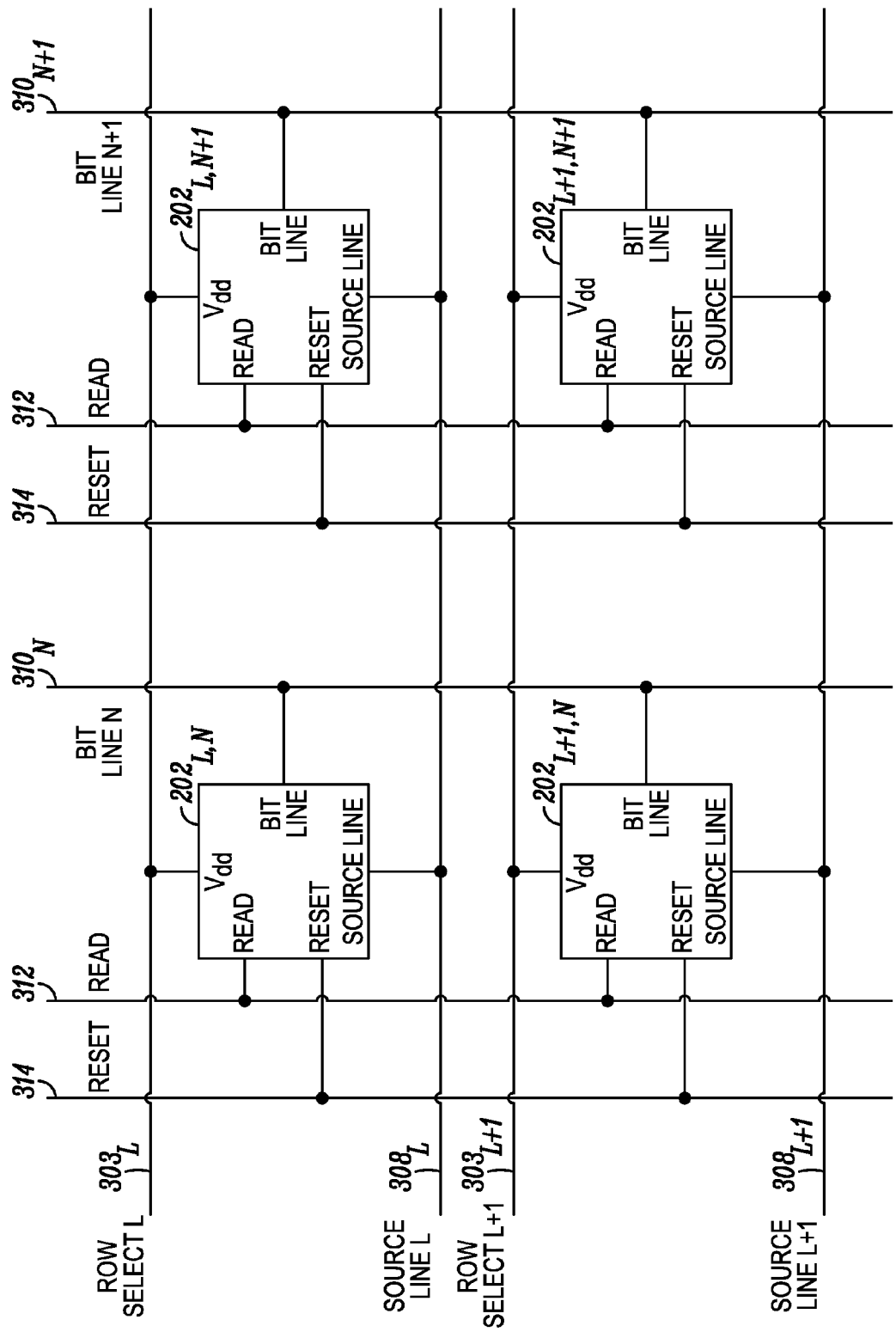
FIG. 4 depicts a portion of the pixel array of FIG. 2 in accordance with an embodiment of the present invention.

Referring to FIG. 4, a portion of the plurality of pixel locations 202 in accordance with the embodiment of the present invention are shown wherein each of the plurality of pixel locations 202 is constructed as shown in FIG. 3. As each of the plurality of pixel locations 202 is capable of sensing light focused thereon by the lens system 132 and storing an analog value representative of the light sensed thereat under control of the controller 136, each of the plurality of pixel locations 202 is electrically connected to a row select line $303_L$ for selectively providing the voltage $V_{dd}$ and connected to a source line $308_L$ and a bit line $310_N$. Each of the plurality of pixel locations 202 is also connected to a read line 312.

Figure 5:
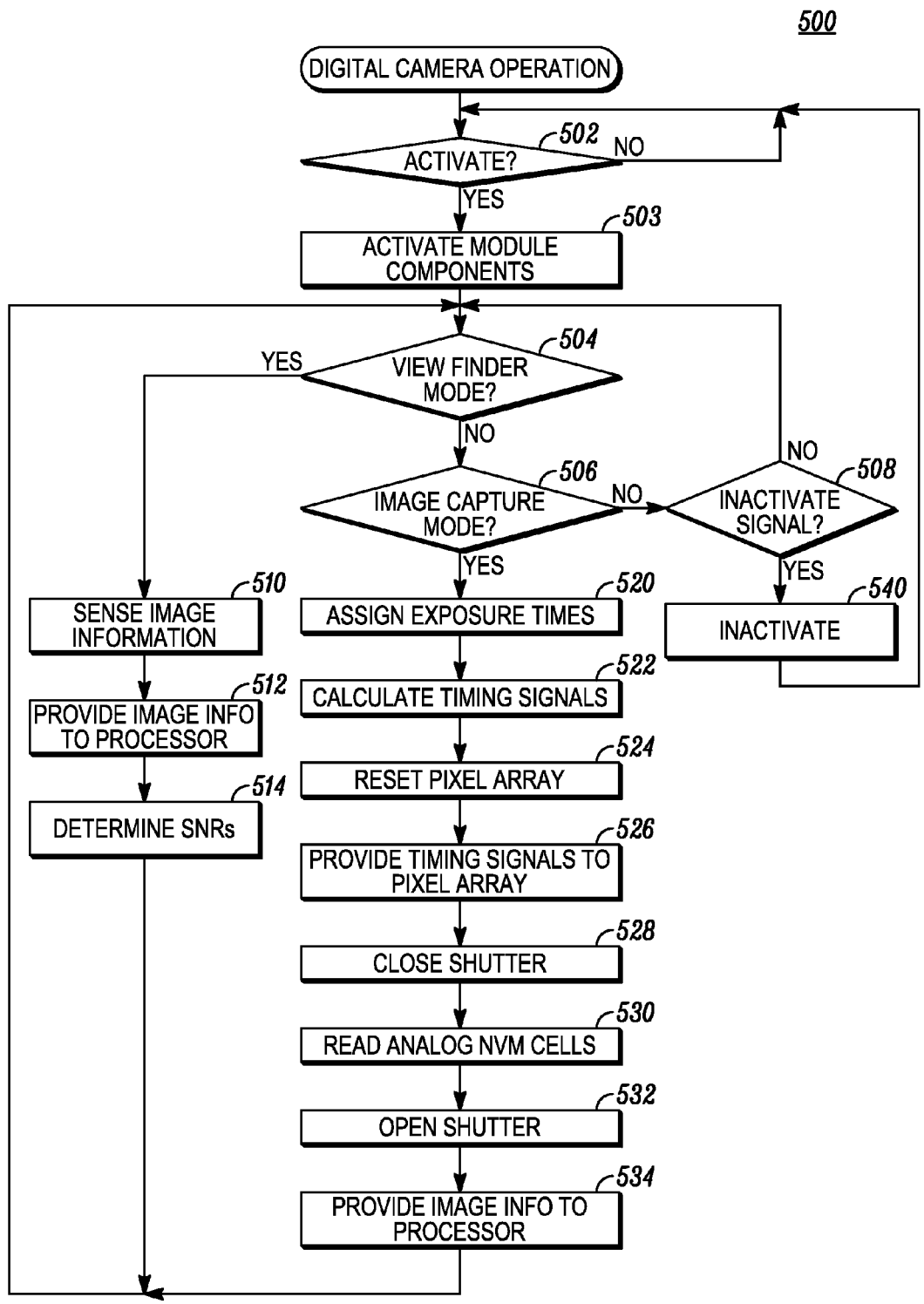
FIG. 5 depicts a flowchart of the operation of a controller of the digital camera module of FIG. 1 in accordance with the embodiment of the present invention.

The controller 136 operates to activate the plurality of light sensitive pixel elements 302 for sensing image information and operates as a memory controller to store the image information in the plurality of pixel locations 202 by providing appropriate control of voltages on the row select lines 303, the source lines 308 and the bit lines 310. This operation of the controller 136 in accordance with the embodiment of the present invention is shown in flowchart 500 of FIG. 5.

Operation of the controller 136 in accordance with the embodiment of the present invention begins by first determining whether the digital camera module 130 has received a an appropriate signal from the processor 110 (FIG. 1) to activate the module 130, such as, for example, a signal provided from the processor 110 to the controller 136 in response to a predetermined user input from the functional key input devices 124.

When the digital camera module 130 receives such a signal 502, the components of the module are activated 503 (e.g., the controller 136 signals the shutter 134 to open) and the controller 136 determines whether operation is in a viewfinder mode 504 or whether a signal has been received from the processor 110 either to place the digital camera module 130 in an image capture mode 506 or to inactivate 508 the digital camera module 130.

During operation in the viewfinder mode 504, the controller 136 senses image information 510 from the pixel array 140, controlling the pixel array 140 to provide a low resolution image for reduction of readout time and improvement of frame rate. The controller 136 then provides 512 the sensed image information to the display 120 via the processor 110 for presentation to the user.

In accordance with the embodiment of the present invention, the controller 136 also determines the signal-to-noise ratios 514 of the plurality of pixel locations 202 of the pixel array 140. Any of several methods for determining signal-to-noise ratios 514 for the plurality of pixel locations 202 known to those skilled in the art may be utilized. In accordance with implementations of the embodiment of the present invention determining signal-to-noise ratios for pixel rows, pixel columns or predetermined quadrants, the signal-to-noise ratio for the plurality of pixel locations 202 may be determined 514 in a two-step process by first performing discrete cosine transformation (DCT) and quantization of portions of a first viewfinder image captured using a first exposure time, the results being stored in a storage area of the controller 136. The controller 136 then changes the exposure time to a second exposure time and performs the DCT and quantization of corresponding portions of a second viewfinder image.

After DCT, each portion of the viewfinder image is stored in the storage area of the controller 136 in a format of eight-by-eight blocks with one direct current (DC) component and sixty-three alternating current (AC) components. The AC components are basically the amplitudes for the frequency components in the image. An AC sum of the portion of the viewfinder image is then calculated by adding together the absolute value of the sixty-three AC components. The signal-to-noise ratio is then determined from a comparison of the AC sum of the DCT results of the portions of the viewfinder image wherein the signal-to-noise ratio is proportional to the AC sum because, since quantization filters out the high frequency noise, the larger the AC sum, the larger AC sum after quantization indicates more detail in the image.

After determination 514 of the signal-to-noise ratios of the portions of the viewfinder image (i.e., the portions of the plurality of pixel locations 202), processing returns to determine whether the controller 136 will continue to operate in the viewfinder mode 504, will switch to the image capture mode 506 or will inactivate 508 the digital camera module 130.

When a signal is received by the controller 136 indicating that a picture is to be taken by the digital camera module 130, operation of the controller 136 switches to the image capture mode 506. In accordance with the embodiment of the present invention, the controller 136 assigns exposure times 520 to the plurality of pixel locations 202 in response to the signal-to-noise ratios determined therefor, wherein a longer exposure time is assigned 520 to portions of the plurality of pixel locations 202 having smaller signal-to-noise ratios and a shorter exposure time is assigned to portions of the plurality of pixel locations 202 having larger signal-to-noise ratios.

As determination of signal-to-noise ratios and calculation and assignment of the plurality of exposure times for each pixel location 202 would require substantial calculation time and/or very sophisticated processing capabilities, in accordance with the embodiment of the present invention, the signal-to-noise ratios can be determined 514 and the exposure times assigned 520 for predetermined portions of the plurality of pixel locations 202, such as for each pixel row 204 or pixel column 206 or for each predetermined quadrant 208. Once the exposure times are assigned 520 for each portion of the plurality of pixel locations 202, the controller 136 determines 522 times for providing a plurality of timing signals to the portions of the plurality of pixel locations 202 such that the exposure of each of the portions of the plurality of pixel locations 202 is coordinated so that all of the plurality of exposure times end simultaneously.

The controller then provides a reset signal 524 on the reset lines 314 to erase the analog nonvolatile memory cells 306 at all of the pixel locations 202 in preparation for capturing and recording a digital image. The timing signals are then provided 526 at the calculated times (determined at step 522) to the corresponding portions of the plurality of pixel locations 202 to create the digital image by exposing each of the portions of the plurality of pixel locations 202 for associated ones of the plurality of exposure times. FIG. 6 depicts an exemplary timing diagram 600 for timing signals for pixel row exposure times to create a digital image wherein the viewfinder mode of operation 504 has determined that the image is brighter in the center than at the edges thereof. A timing signal 602 provided to an upper one of the plurality of pixel rows 204 switches high at a time 604 to initiate the exposure time of the upper one of the plurality of pixel rows 204, while a timing signal 606 provided to a lower one of the plurality of pixel rows 204 also switches high at the time 604 to initiate its exposure time. A timing signal 608 is provided to a center one of the plurality of pixel rows 604 at a later time 610 to initiate the exposure thereof, the shorter exposure time corresponding to a brighter center portion (i.e., a higher measured signal-to-noise ratio) of the image. Timing signals 612 initiate exposure times between the time 604 and the time 610, with all timing signals 602, 606, 608, 612 switching low at time 614 to terminate the exposure times simultaneously.

Referring back to FIG. 5, after the appropriate timing signals are provided 526 to the plurality of pixel locations 202 for exposure thereof in accordance with the assigned exposure times, the pixel array 140 is shuttered 528 either electronically or by signaling the mechanical shutter 134 to close and the plurality of pixel locations are read 530 by reading the values of the analog nonvolatile memory cells 306. In the image capture mode, the digital camera module 130 will create a full resolution image digital image (i.e., a higher resolution image than in the viewfinder mode). Because the full resolution image requires a fairly long time for the controller 136 to read the data out of each of the plurality of pixel locations 202, the pixel array 140 remains shuttered to prevent light from contaminating the pixel locations 202 during readout. Accordingly, when all of the plurality of pixel locations 202 have been read 530, the shutter is "opened" 532.

The controller 136 then provides 534 image information to the processor 110 representing the digital image. The processor 110 can then provide the image information to the display 120 for presentation of the digital image to the user, provide the image information to the memory 112, or provide the image information to the transmitter circuitry 108 for transmission of the digital image from the wireless communication device 100.

After providing the image information 534 to the processor 110, operation of the controller 136 of the digital camera module 130 returns to determine if the operational mode returns to the viewfinder mode 504 or enters another image capture mode 506 or whether a signal has been received to inactivate 508 the digital camera module 130. When a signal is received to inactivate 508 the digital camera module 130, the controller inactivates 540 the components of the digital camera module 130 and processing by the controller 136 returns to await a subsequent signal to activate 502 the module 130.

Thus it can be seen that a method and apparatus have been disclosed which advantageously provides improved digital image creation by assigning different exposure times to different portions of the plurality of pixel locations 202 of a pixel array 140 in response to signal-to-noise ratios measured for such portions of the pixel array 140. While the embodiment of the present invention disclosed hereinabove provides a method and apparatus for individually addressing each pixel location 202 to create a higher quality digital image than conventional methods and apparati, such method requires high interconnect complexity and significant computational time. Accordingly, the embodiment of the present invention disclosed hereinabove also provides a method and apparatus for varying exposure times line-by-line within the pixel array 140 to reduce the complexity and computational time. In addition, the embodiment of the present invention disclosed hereinabove presents a method and apparatus which provides better uniformity of the improved digital image but a higher interconnect complexity (though not as high as the pixel-by-pixel method) by defining predetermined quadrants of the pixel array and varying the exposure times quadrant-by-quadrant.

Use of the method and apparatus in accordance with the embodiment of the present invention in digital camera modules 130 improves low-light performance, thereby eliminating the need for software digital lens shading correction schemes while providing better signal-to-noise ratios in the corners of the digital image, better brightness uniformity across the digital image (leading to better white balance of the digital image), and better color of the digital image due to the better white balance thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for digital imaging comprising the steps of:
   determining a first signal-to-noise ratio associated with light sensed at a first pixel location of a plurality of pixel locations and a second signal-to-noise ratio associated with light sensed at a second pixel location of the plurality of pixel locations;
   assigning a first exposure time to the first pixel location in response to determining the first signal-to-noise ratio;
   assigning a second exposure time to the second pixel in response to determining the second signal-to-noise ratio, wherein the second exposure time is different than the first exposure time; and
   after assigning the first exposure time and the second exposure time, exposing the first pixel location for the first exposure time while exposing the second pixel location for the second exposure time to create a digital image.

2. The method in accordance with claim 1 wherein the first and second determining steps are performed during a viewfinder mode.

3. The method in accordance with claim 1 wherein a plurality of exposure times include the first and second exposure times, the method further comprising the steps of assigning additional ones of the plurality of exposure times for associated ones of the plurality of pixel locations, wherein each of the plurality of exposure times is determined in response to a signal-to-noise ratio associated with the associated one of the plurality of pixel locations.

4. The method in accordance with claim 3 wherein the step of exposing the first and second pixel locations comprises the step of exposing each of the plurality of pixel locations for the associated one of the plurality of exposure times.

5. The method in accordance with claim 4 wherein the step of exposing each of the plurality of pixel locations for the associated one of the plurality of exposure times comprises the step of coordinating the exposure of each of the plurality of pixel locations such that the plurality of exposure times end simultaneously.

6. The method in accordance with claim 1 wherein the plurality of pixel locations are arranged in an array having a plurality of pixel rows and a plurality of pixel columns.

7. The method in accordance with claim 6 wherein the first pixel location is located in a first one of the plurality of pixel rows and the second pixel location is located in a second one of the plurality of pixel rows, and wherein the step of assigning the first exposure time to the first pixel location comprises the step of assigning a first row exposure time associated with the first one of the plurality of pixel rows to the first pixel location, and wherein the step of assigning the second exposure time to the second pixel location comprises the step of assigning a second row exposure time associated with the second one of the plurality of pixel rows to the second pixel location.

8. The method in accordance with claim 7 wherein a plurality of row exposure times include the first and second row exposure times, the method further comprising the steps of assigning additional ones of the plurality of row exposure times for associated ones of the plurality of pixel rows, wherein each of the plurality of row exposure times is determined in response to signal-to-noise ratios of the ones of the plurality of pixel locations located in the one of the plurality of pixel rows.

9. The method in accordance with claim 8 wherein the steps of assigning ones of the plurality of row exposure times to associated ones of the plurality of pixel rows comprises the step of determining ones of the plurality of row exposure times in response to alternating current components of discrete cosine transformation of exposed light values of the plurality of pixel locations located in associated ones of the plurality of pixel rows.

10. The method in accordance with claim 8 wherein the step of exposing the first and second pixel locations comprises the step of exposing each of the plurality of pixel locations for an associated one of the plurality of row exposure times, the associated one of the plurality of row exposure times determined in response to the one of the plurality of pixel rows in which the each of the plurality of pixel locations is located.

11. The method in accordance with claim 10 wherein the step of exposing each of the plurality of pixel locations for the associated one of the plurality of row exposure times comprises the step of coordinating the exposure of each of the plurality of pixel locations such that the plurality of row exposure times end simultaneously.

12. The method in accordance with claim 6 wherein the first pixel location is located in a first one of the plurality of pixel columns and the second pixel location is located in a second one of the plurality of pixel columns, and wherein the step of assigning the first exposure time to the first pixel location comprises the step of assigning a first column exposure time associated with the first one of the plurality of pixel columns to the first pixel location, and wherein the step of assigning the second exposure time to the second pixel location comprises the step of assigning a second column exposure time associated with the second one of the plurality of pixel columns to the second pixel location.

13. The method in accordance with claim 6 wherein the array includes a plurality of predetermined quadrants.

14. The method in accordance with claim 13 wherein the first pixel location is located in a first one of the plurality of predetermined quadrants and the second pixel location is located in a second one of the plurality of predetermined quadrants, and wherein the step of assigning the first exposure time to the first pixel location comprises the step of assigning a first quadrant exposure time associated with the first one of the plurality of predetermined quadrants to the first pixel location, and wherein the step of assigning the second exposure time to the second pixel location comprises the step of assigning a second quadrant exposure time associated with the second one of the plurality of predetermined quadrants to the second pixel location.

15. The method in accordance with claim 14 wherein a plurality of quadrant exposure times include the first and second quadrant exposure times, the method further comprising the steps of assigning additional ones of the plurality of quadrant exposure times for associated ones of the plurality of pixel locations, wherein each of the plurality of quadrant exposure times is determined in response to signal-to-noise ratios of ones of the plurality of pixel locations located in associated ones of the plurality of predetermined quadrants.

16. The method in accordance with claim 15 wherein the step of assigning additional ones of the plurality of quadrant exposure times for associated ones of the plurality of predetermined quadrants comprises the step of determining ones of the plurality of quadrant exposure times in response to alternating current components of discrete cosine transformation of exposed light values of the plurality of pixel locations located in associated ones of the plurality of predetermined quadrants.

17. The method in accordance with claim 15 wherein the step of exposing the first and second pixel locations comprises the step of exposing each of the plurality of pixel locations for an associated one of the plurality of quadrant exposure times, the associated one of the plurality of quadrant exposure times determined in response to the one of the plurality of predetermined quadrants in which the each of the plurality of pixel locations is located.

18. The method in accordance with claim 17 wherein the step of exposing each of the plurality of pixel locations for the associated one of the plurality of quadrant exposure times comprises the step of coordinating the exposure of each of the plurality of pixel locations such that the plurality of quadrant exposure times end simultaneously.

19. A digital camera module comprising:
a plurality of light sensitive pixel elements; and
a controller coupled to the plurality of light sensitive pixel elements and configured to determine a first signal-to-noise ratio associated with light sensed at a first light sensitive pixel element of the plurality of light sensitive pixel elements, to determine a second signal-to-noise ratio associated with light sensed at a second light sensitive pixel element of the plurality of light sensitive pixel elements, to assign a first exposure time to the first light sensitive pixel element in response to the first signal-to-noise ratio, to assign a second exposure time to the second light sensitive pixel element in response to the second signal-to-noise ratio, wherein the second exposure time is different from the first exposure time, and after assigning the first exposure time and the second exposure time, to provide one of a plurality of timing signals to each of the plurality of light sensitive pixel elements for recording a digital image, the one of the plurality of timing signals provided to one of the plurality of light sensitive pixel elements determined in response to the one of the plurality of exposure times assigned to the one of the plurality of light sensitive pixel elements.

20. The digital camera module in accordance with claim 19 wherein the controller operates in either a viewfinder mode or an image capture mode, the controller determining the signal-to-noise ratios measured by the plurality of light sensitive pixel elements during the viewfinder mode and providing the plurality of timing signals to the plurality of light sensitive pixel elements for recording the digital image during the image capture mode.

21. The digital camera module in accordance with claim 19 further comprising a lens system for focusing light passing through the lens system onto the plurality of light sensitive pixel elements, wherein the plurality of light sensitive pixel elements are arranged in an array within a light path of light passing through the lens system, the array having a plurality of pixel rows and a plurality of pixel columns.

22. The digital camera module in accordance with claim 20 wherein the controller coordinates the provision of the plurality of timing signals to the plurality of light sensitive pixel elements such that the plurality of timing signals deactivates each of the plurality of light sensitive pixel elements simultaneously.

23. The digital camera module in accordance with claim 20 further comprising a plurality of analog nonvolatile memory cells, each of the plurality of analog nonvolatile memory cells coupled to an associated one of the plurality of light sensitive pixel elements for storing a pixel value associated with a portion of the digital image, the pixel value corresponding to an amount of light sensed by the associated one of the plurality of light sensitive pixel elements when activated by the associated one of the plurality of timing signals.

24. The digital camera module in accordance with claim 21 wherein the controller assigns one of a plurality of row exposure times to each of the plurality of light sensitive pixel elements in response to the one of the plurality of pixel rows in which the each of the plurality of light sensitive pixel elements is located, and wherein the controller provides one of the plurality of timing signals to each of the plurality of light sensitive pixel elements for recording a digital image, the one of the plurality of timing signals provided to the one of the plurality of light sensitive pixel elements determined by the controller in response to the one of the plurality of row exposure times assigned to the one of the plurality of light sensitive pixel elements.

25. The digital camera module in accordance with claim 24, wherein the controller calculates ones of the plurality of row exposure times in response to alternating current components of discrete cosine transformation of exposed light values measured by ones of the plurality light sensitive pixel elements located in associated ones of the plurality of pixel rows.

26. The digital camera module in accordance with claim 21 wherein the controller assigns one of a plurality of column exposure times to each of the plurality of light sensitive pixel elements in response to the one of the plurality of pixel columns in which the each of the plurality of light sensitive pixel elements is located, and wherein the controller provides one of the plurality of timing signals to each of the plurality of light sensitive pixel elements for recording a digital image, the one of the plurality of timing signals provided to the one of the plurality of light sensitive pixel elements determined by the controller in response to the one of the plurality of column exposure times assigned to the one of the plurality of light sensitive pixel elements.

27. The digital camera module in accordance with claim 21 wherein the array includes a plurality of predetermined quadrants, wherein the controller assigns one of a plurality of quadrant exposure times to each of the plurality of light sensitive pixel elements in response to the one of the plurality of predetermined quadrants in which the each of the plurality of light sensitive pixel elements is located, and wherein the controller provides one of the plurality of timing signals to each of the plurality of light sensitive pixel elements for recording a digital image, the one of the plurality of timing signals provided to the one of the plurality of light sensitive pixel elements determined by the controller in response to the one of the plurality of quadrant exposure times assigned to the one of the plurality of light sensitive pixel elements.

28. The digital camera module in accordance with claim 27, wherein the controller calculates ones of the plurality of quadrant exposure times in response to alternating current components of discrete cosine transformation of exposed light values measured by ones of the plurality light sensitive pixel elements located in associated ones of the plurality of predetermined quadrants.

29. A mobile communication device comprising:
a plurality of light sensitive pixel elements;
a controller coupled to the plurality of light sensitive pixel elements and configured to determine a first signal-to-noise ratio associated with light sensed at a first light sensitive pixel element of the plurality of light sensitive pixel elements, to determine a second signal-to-noise ratio associated with light sensed at a second light sensitive pixel element of the plurality of light sensitive pixel elements, to assign a first exposure time to the first light sensitive pixel element in response to the first signal-to-noise ratio, to assign a second exposure time to the second light sensitive pixel element in response to the second signal-to-noise ratio, wherein the second exposure time is different from the first exposure time, and after assigning the first exposure time and the second exposure time, to provide one of a plurality of timing signals to each of the plurality of light sensitive pixel elements for recording a digital image, the one of the plurality of timing signals provided to one of the plurality of light sensitive pixel elements determined by the controller in response to the one of the plurality of exposure times assigned to the one of the plurality of light sensitive pixel elements;
a storage device coupled to the controller for storing the digital image as image information;
a processor coupled to the storage device for selectively retrieving the image information corresponding to the digital image; and
transmitter circuitry coupled to the processor for transmitting the digital image when the image information corresponding to the digital image is provided to the transmitter circuitry by the processor.

30. The mobile communication device in accordance with claim 29 further comprising a lens system for focusing light passing through the lens system onto the plurality of light sensitive pixel elements, wherein the plurality of light sensitive pixel elements are arranged in an array within a light path of light passing through the lens system, the array having a plurality of pixel rows and a plurality of pixel columns.

31. The mobile communication device in accordance with claim 29 further comprising a plurality of analog nonvolatile memory cells, each of the plurality of analog nonvolatile memory cells coupled to an associated one of the plurality of light sensitive pixel elements for storing a pixel value associated with a portion of the digital image, the pixel value corresponding to an amount of light sensed by the associated one of the plurality of light sensitive pixel elements when activated by the associated one of the plurality of timing signals, wherein the controller is coupled to each of the plurality of analog nonvolatile memory cells and composes the digital image from the pixel values from each of the plurality of analog nonvolatile memory cells after the timing signals have deactivated the plurality of light sensitive pixel elements.

32. The mobile communication device in accordance with claim 29 further comprising user interface devices coupled to the processor and including user input devices for providing user inputs to the processor, wherein the processor provides signals to the controller for control of the plurality of light sensitive pixel elements in response to the user inputs received from the user interface devices.

33. The mobile communication device in accordance with claim 32 wherein the user interface devices further include a display coupled to the processor for presenting the digital image in response to the image information provided by the processor thereto.

34. A digital imaging device comprising:

a plurality of light sensitive pixel elements;

a plurality of analog nonvolatile memory cells, each of the plurality of analog nonvolatile memory cells coupled to an associated one of the plurality of light sensitive pixel elements for storing an exposed light pixel value associated with a portion of a digital image, the exposed light pixel value corresponding to an amount of light sensed by the associated one of the plurality of light sensitive pixel elements during one of a plurality of exposure times; and a controller coupled to the plurality of analog nonvolatile memory cells for activating each of the plurality of analog nonvolatile memory cells for an associated one of the plurality of exposure times, wherein the controller is further for determining a first signal-to-noise ratio associated with light sensed at a first light sensitive pixel element of the plurality of light sensitive pixel elements, determining a second signal-to-noise ratio associated with light sensed at a second light sensitive pixel element of the plurality of light sensitive pixel elements, and, prior to activating each of the plurality of analog nonvolatile memory cells, assigning a first exposure time of the plurality of exposure times to the first light sensitive pixel element in response to the first signal-to-noise ratio, and assigning a second exposure time to the second light sensitive pixel element in response to the second signal-to-noise ratio, wherein the second exposure time is different from the first exposure time.

35. The digital imaging device in accordance with claim 34 wherein the controller measures signal-to-noise ratios of image information detected by the plurality of light sensitive pixel elements in response to exposed light values stored in the plurality of analog nonvolatile memory cells.

36. The digital imaging device in accordance with claim 34 wherein the controller creates a digital image in response to the exposed light pixel values of each of the plurality of analog nonvolatile memory cells.

\* \* \* \* \*